US012096194B2

(12) United States Patent
Fujii et al.

(10) Patent No.: US 12,096,194 B2
(45) Date of Patent: Sep. 17, 2024

(54) PROCESSING DEVICE, PROCESSING METHOD, FILTER GENERATION METHOD, REPRODUCING METHOD, AND COMPUTER READABLE MEDIUM

(71) Applicant: JVCKENWOOD Corporation, Yokohama (JP)

(72) Inventors: Yumi Fujii, Yokohama (JP); Toshiaki Nagai, Yokohama (JP); Hisako Murata, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 194 days.

(21) Appl. No.: 17/833,516

(22) Filed: Jun. 6, 2022

(65) Prior Publication Data

US 2022/0303690 A1 Sep. 22, 2022

Related U.S. Application Data

(63) Continuation of application No. PCT/JP2020/041272, filed on Nov. 5, 2020.

(30) Foreign Application Priority Data

Dec. 23, 2019 (JP) ................................ 2019-232007

(51) Int. Cl.
*H04R 5/04* (2006.01)
*G10K 15/00* (2006.01)
(Continued)

(52) U.S. Cl.
CPC ............... *H04R 5/04* (2013.01); *H04R 5/033* (2013.01); *H04R 29/002* (2013.01); *H04R 29/005* (2013.01); *H04R 2400/01* (2013.01)

(58) Field of Classification Search
None
See application file for complete search history.

(56) References Cited

U.S. PATENT DOCUMENTS

2009/0238371 A1* 9/2009 Rumsey ............... H04R 29/001 381/58
2016/0126914 A1* 5/2016 Voix ......................... H03G 3/32 381/57
(Continued)

FOREIGN PATENT DOCUMENTS

JP 2016181886 A 10/2016

OTHER PUBLICATIONS

Schroder, Jurgen. DE102018120229A1, English translation from EPO. 33 pages. (Year: 2018).*

*Primary Examiner* — Qin Zhu
(74) *Attorney, Agent, or Firm* — PROCOPIO, CORY, HARGREAVES & SAVITCH LLP

(57) ABSTRACT

A processing device according to this embodiment includes: a measurement signal output unit configured to output a frequency sweep signal whose frequency is swept as a measurement signal; a sound pickup signal acquisition unit configured to acquire L-ch and R-ch sound pickup signals obtained by picking up the measurement signal by a left microphone and a right microphone; an evaluation signal acquisition unit configured to calculate an evaluation signal in a time domain in accordance with the L-ch and R-ch sound pickup signals; an extraction unit configured to extract a partial section of the evaluation signal as an extraction section; a comparison unit configured to compare the L-ch sound pickup signal with the R-ch sound pickup signal using the evaluation signal in the extraction section; and a determination unit configured to determine whether the fit of the right and left microphones or the output unit is
(Continued)

good or not based on the results of the comparison made in the comparison unit.

9 Claims, 7 Drawing Sheets

(51) Int. Cl.

| | |
|---|---|
| ***H04R 5/033*** | (2006.01) |
| ***H04R 29/00*** | (2006.01) |
| ***H04S 7/00*** | (2006.01) |

(56) References Cited

U.S. PATENT DOCUMENTS

| | | | | |
|---|---|---|---|---|
| 2019/0130927 | A1* | 5/2019 | Gómez-Bolaños | G10L 21/0224 |
| 2022/0167105 | A1* | 5/2022 | Lyons | H04S 7/301 |
| 2022/0210592 | A1* | 6/2022 | Fridman | H04R 29/008 |

* cited by examiner

PROCESSING DEVICE, PROCESSING METHOD, FILTER GENERATION METHOD, REPRODUCING METHOD, AND COMPUTER READABLE MEDIUM

CROSS REFERENCE TO RELATED APPLICATION

This application is based upon and claims the benefit of priority from Japanese patent application No. 2019-232007, filed on Dec. 23, 2019, the disclosure of which is incorporated herein in its entirety by reference.

BACKGROUND

The present disclosure relates to a processing device, a processing method, a filter generation method, a reproducing method, and a computer readable medium.

Sound localization techniques include an out-of-head localization technique, which localizes sound images outside the head of a listener by using headphones. The out-of-head localization technique localizes sound images outside the head by canceling out characteristics from the headphones to the ears (headphone characteristics) and giving two characteristics (spatial acoustic transfer characteristics) from a speaker (monaural speaker) to the ears.

In out-of-head localization reproduction using stereo speakers, measurement signals (impulse sounds or the like) that are output from 2-channel (hereinafter, referred to as "ch") speakers are recorded by microphones placed on the ears of a listener himself/herself. A processing device generates a filter based on a sound pickup signal obtained by picking up the measurement signals. The generated filter is convolved with 2-ch audio signals, and the out-of-head localization reproduction is thereby achieved.

Further, in order to generate filters (also referred to as inverse filters) that cancel out characteristics from headphones to the ears, characteristics from the headphones to the ears or eardrums (ear canal transfer function ECTF, also referred to as ear canal transfer characteristics) are measured by the microphones placed on the ears of the listener himself/herself.

Patent Literature 1 (Japanese Unexamined Patent Application Publication No. 2016-181886) discloses a method of obtaining a filter factor using a frequency sweep signal whose frequency is gradually changed. Specifically, the apparatus according to Patent Literature 1 convolves inverse characteristics (inverse filters) of ear canal transfer characteristics with the frequency sweep signal. The frequency sweep signal where the inverse characteristics are convolved is listened by a listener. Then, the frequency of a peak or a dip is specified. Then, the filter factor for correcting the peak or the dip is set.

SUMMARY

When performing out-of-head localization, it is preferable to measure characteristics with microphones placed on the ears of the listener himself/herself. When ear canal transfer characteristics are measured, impulse response measurement and the like are performed with microphones and headphones (including inner ear headphones, or earphones, the same is true hereafter) placed on the ears of the listener. A use of characteristics of the listener himself/herself enables a filter suited for the listener to be generated.

It is desirable to appropriately process a sound pickup signal obtained in the measurement for filter generation and the like. If, for example, the listener does not properly wear the microphones or headphones, an appropriate filter cannot be generated. If, for example, the headphones cannot seal the space inside the ear (in particular, the entrance of the ear canal) when the listener wears the headphones, bass sound is leaking out from the headphones. If the inverse filters are generated in a state in which the bass sound is leaking out from the headphones, inverse filters in which the bass sound is boosted (enhanced) are generated so as to complement the bass sound that is leaking out from the headphones. Therefore, if the sealing state in the right headphone and that in the left headphone are different from each other, the inverse filters where the bass sound is boosted are generated in the headphone from which the bass sound is leaking, which causes a variation between the right characteristics and the left characteristics. If inverse filters are generated in the state in which a variation between the right characteristics and the left characteristics is occurring, imbalance of the sound fields occurs.

Therefore, it is desirable that the measurement be performed in a state in which there is no variation between the right and the left. Accordingly, a method for determining whether there is no variation between the right and the left is required.

The present disclosure has been made in consideration of the above-described problems, and an object of the present disclosure is to provide a processing device, a processing method, a filter generation method, a reproducing method, and a program capable of appropriately processing sound pickup signals.

A processing device according to this embodiment includes: a measurement signal output unit configured to output a frequency sweep signal whose frequency is swept, which is a measurement signal, to each of right and left output units of headphones or earphones; a sound pickup signal acquisition unit configured to acquire, by a left microphone worn on the left ear of a listener, an L-ch sound pickup signal obtained by picking up the measurement signal and acquire, by a right microphone worn on the right ear of the listener, an R-ch sound pickup signal obtained by picking up the measurement signal; an evaluation signal acquisition unit configured to acquire an evaluation signal in a time domain in accordance with the L-ch and R-ch sound pickup signals; an extraction unit configured to extract a partial section of the evaluation signal as an extraction section; a comparison unit configured to compare the L-ch sound pickup signal with the R-ch sound pickup signal using the evaluation signal in the extraction section; and a determination unit configured to determine whether the fit of the right and left microphones or the output unit is good or not based on the results of the comparison made in the comparison unit.

A processing method according to this embodiment includes: outputting a frequency sweep signal whose frequency is swept, which is a measurement signal, to each of right and left output units of headphones or earphones; acquiring, by a left microphone worn on the left ear of a listener, an L-ch sound pickup signal obtained by picking up the measurement signal and acquiring, by a right microphone worn on the right ear of the listener, an R-ch sound pickup signal obtained by picking up the measurement signal; acquiring an evaluation signal in a time domain in accordance with the L-ch and R-ch sound pickup signals; extracting a partial section of the evaluation signal as an extraction section; comparing the L-ch sound pickup signal with the R-ch sound pickup signal using the evaluation signal in the extraction section; and determining whether the fit of the right and left microphones or the output unit is good or not based on the results of the comparison made in the comparing step.

A computer readable medium according to this embodiment is a computer readable medium storing a program for causing a computer to execute a processing method, the processing method including steps of: outputting a frequency sweep signal whose frequency is swept, which is a measurement signal, to each of right and left output units of headphones or earphones; acquiring, by a left microphone worn on the left ear of a listener, an L-ch sound pickup signal obtained by picking up the measurement signal and acquiring, by a right microphone worn on the right ear of the listener, an R-ch sound pickup signal obtained by picking up the measurement signal; acquiring an evaluation signal in a time domain in accordance with the L-ch and R-ch sound pickup signals; extracting a partial section of the evaluation signal as an extraction section; comparing the L-ch sound pickup signal with the R-ch sound pickup signal using the evaluation signal in the extraction section; and determining whether the fit of the right and left microphones or the output unit is good or not based on the results of the comparison made in the comparing step.

DETAILED DESCRIPTION

An overview of sound localization according to the present embodiment will be described. Out-of-head localization according to the present embodiment performs out-of-head localization by using spatial acoustic transfer characteristics and ear canal transfer characteristics. The spatial acoustic transfer characteristics are transfer characteristics from a sound source such as a speaker, to the ear canal. The ear canal transfer characteristics are transfer characteristics from a speaker unit of headphones or earphones to the eardrum. In the present embodiment, spatial acoustic transfer characteristics while headphones or earphones are not worn are measured, ear canal transfer characteristics while headphones or earphones are worn are measured, and the out-of-head localization is achieved by using measurement data in the measurements. The present embodiment has a distinctive feature in a microphone system for measuring spatial acoustic transfer characteristics or ear canal transfer characteristics.

The out-of-head localization according to this embodiment is performed by a user terminal such as a personal computer, a smartphone, and a tablet PC. The user terminal is an information processing device including processing means such as a processor, storage means such as a memory and a hard disk, display means such as a liquid crystal monitor, and input means such as a touch panel, a button, a keyboard, and a mouse. The user terminal may have a communication function to transmit and receive data. Further, output means (output unit) with headphones or earphones is connected to the user terminal. The user terminal and the output means may be connected to each other by means of wired connection or wireless connection.

First Embodiment (Out-of-Head Localization Device)

Figure 1:
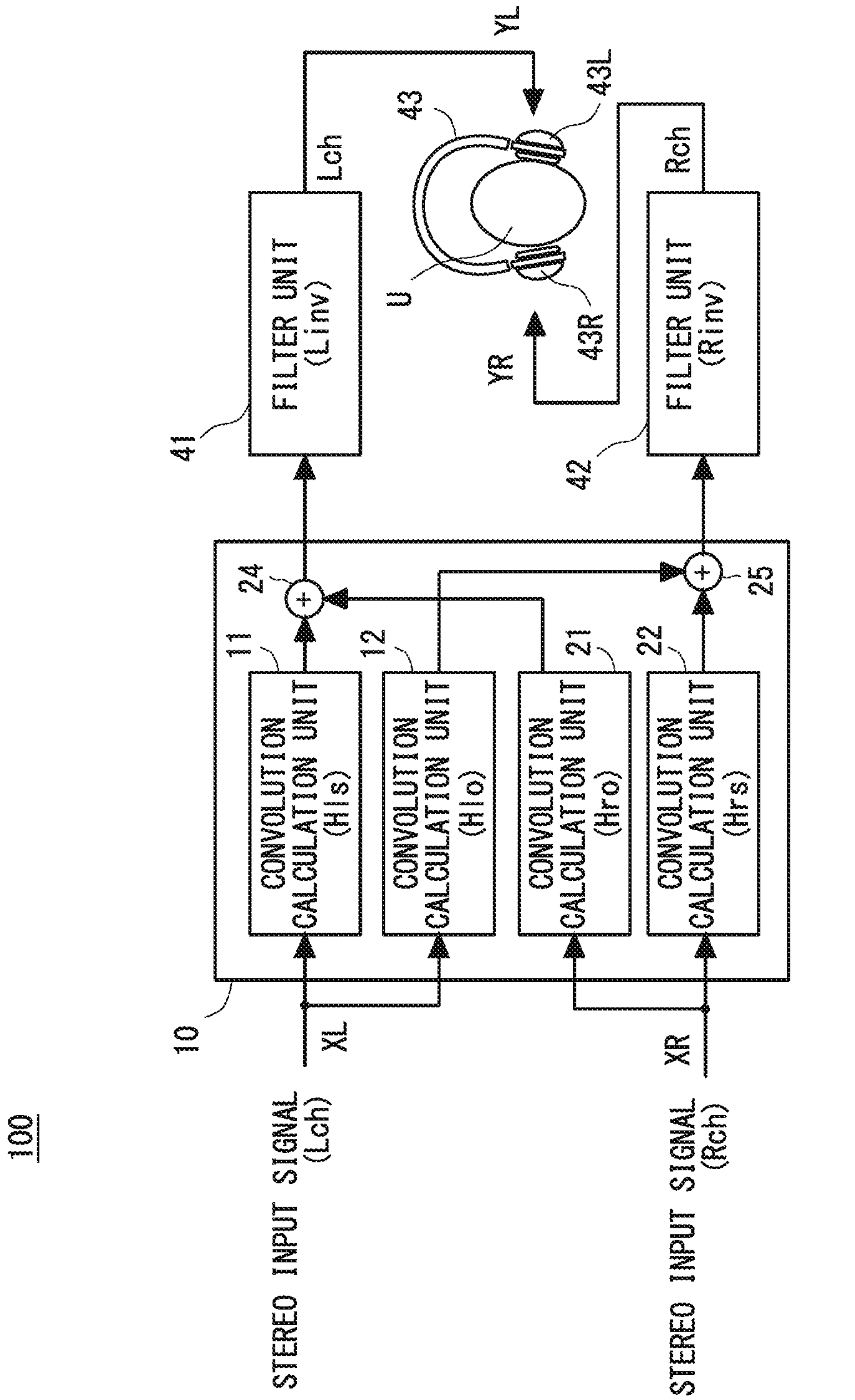
FIG. 1 is a block diagram showing an out-of-head localization device according to this embodiment.

A block diagram of an out-of-head localization device 100, which is an example of a sound field reproduction device according to the present embodiment, is shown in FIG. 1. The out-of-head localization device 100 reproduces a sound field for a user U who is wearing headphones 43. Thus, the out-of-head localization device 100 performs sound localization for L-ch and R-ch stereo input signals XL and XR. The L-ch and R-ch stereo input signals XL and XR are analog audio reproduction signals that are output from a CD (Compact Disc) player or the like or digital audio data, such as mp3 (MPEG Audio Layer-3). Note that the audio reproduction signals or the digital audio data are collectively referred to as reproduction signals. In other words, the L-ch and R-ch stereo input signals XL and XR serve as the reproduction signals.

Note that the out-of-head localization device 100 is not limited to a physically single device, and a part of processing may be performed in a different device. For example, a part of processing may be performed by a smartphone or the like, and the rest of the processing may be performed by a Digital Signal Processor (DSP) or the like built in the headphones 43.

The out-of-head localization device 100 includes an out-of-head localization unit 10, a filter unit 41 storing an inverse filter Linv, a filter unit 42 storing an inverse filter Rinv, and the headphones 43. The out-of-head localization unit 10, the filter unit 41, and the filter unit 42 can specifically be implemented by a processor or the like.

The out-of-head localization unit 10 includes convolution calculation units 11, 12, 21, and 22 that store spatial acoustic transfer characteristics Hls, Hlo, Hro, and Hrs, respectively, and adders 24 and 25. The convolution calculation units 11, 12, 21, and 22 perform convolution processing using the spatial acoustic transfer characteristics. The stereo input signals XL and XR from a CD player or the like are input to the out-of-head localization unit 10. The out-of-head localization unit 10 has the spatial acoustic transfer characteristics set therein. The out-of-head localization unit 10 convolves filters having the spatial acoustic transfer characteristics (hereinafter, also referred to as spatial acoustic filters) with each of the stereo input signals XL and XR on the respective channels. The spatial acoustic transfer characteristics may be a head-related transfer function HRTF measured on the head or auricle of a person being measured, or may be the head-related transfer function of a dummy head or a third person.

A set of the four spatial acoustic transfer characteristics Hls, Hlo, Hro, and Hrs is defined as a spatial acoustic transfer function. Data used for the convolution in the convolution calculation units 11, 12, 21, and 22 serve as the spatial acoustic filters. A spatial acoustic filter is generated by cutting out each of the spatial acoustic transfer characteristics Hls, Hlo, Hro, and Hrs with a specified filter length.

Each of the spatial acoustic transfer characteristics Hls, Hlo, Hro, and Hrs has been acquired in advance by means of impulse response measurement or the like. For example, the user U wears a microphone on each of the left and right ears. Left and right speakers placed in front of the user U output impulse sounds for performing impulse response measurement. Then, the microphones pick up measurement signals, such as the impulse sounds, output from the speakers. The spatial acoustic transfer characteristics Hls, Hlo, Hro, and Hrs are acquired based on sound pickup signals picked up by the microphones. The spatial acoustic transfer characteristics Hls between the left speaker and the left microphone, the spatial acoustic transfer characteristics Hlo between the left speaker and the right microphone, the spatial acoustic transfer characteristics Hro between the right speaker and the left microphone, and the spatial acoustic transfer characteristics Hrs between the right speaker and the right microphone are measured.

The convolution calculation unit 11 convolves a spatial acoustic filter appropriate to the spatial acoustic transfer characteristics Hls with the L-ch stereo input signal XL. The convolution calculation unit 11 outputs the convolution calculation data to the adder 24. The convolution calculation unit 21 convolves a spatial acoustic filter appropriate to the spatial acoustic transfer characteristics Hro with the R-ch stereo input signal XR. The convolution calculation unit 21 outputs the convolution calculation data to the adder 24. The adder 24 adds the two sets of convolution calculation data and outputs the added data to the filter unit 41.

The convolution calculation unit 12 convolves a spatial acoustic filter appropriate to the spatial acoustic transfer characteristics Hlo with the L-ch stereo input signal XL. The convolution calculation unit 12 outputs the convolution calculation data to the adder 25. The convolution calculation unit 22 convolves a spatial acoustic filter appropriate to the spatial acoustic transfer characteristics Hrs with the R-ch stereo input signal XR. The convolution calculation unit 22 outputs the convolution calculation data to the adder 25. The adder 25 adds the two sets of convolution calculation data and outputs the added data to the filter unit 42.

The inverse filters Linv and Rinv that cancel out headphone characteristics (characteristics between reproduction units of the headphones and microphones) are set to the filter units 41 and 42, respectively. The inverse filters Linv and Rinv are convolved with the reproduction signals (convolution calculation signals) that have been subjected to the processing in the out-of-head localization unit 10. The filter unit 41 convolves the inverse filter Linv of the L-ch side headphone characteristics with the L-ch signal from the adder 24. Likewise, the filter unit 42 convolves the inverse filter Rinv of the R-ch side headphone characteristics with the R-ch signal from the adder 25. The inverse filters Linv and Rinv cancel out characteristics from a headphone unit to the microphones when the headphones 43 are worn. Each of the microphones may be placed at any position between the entrance of the ear canal and the eardrum.

The filter unit 41 outputs a processed L-ch signal YL to a left unit 43L of the headphones 43. The filter unit 42 outputs a processed R-ch signal YR to a right unit 43R of the headphones 43. The user U is wearing the headphones 43. The headphones 43 output the L-ch signal YL and the R-ch signal YR (hereinafter, the L-ch signal YL and the R-ch signal YR are also collectively referred to as stereo signals) toward the user U. This configuration enables a sound image localized outside the head of the user U to be reproduced.

As described above, the out-of-head localization device 100 performs out-of-head localization by using the spatial acoustic filters appropriate to the spatial acoustic transfer characteristics Hls, Hlo, Hro, and Hrs and the inverse filters Linv and Rinv of the headphone characteristics. In the following description, the spatial acoustic filters appropriate to the spatial acoustic transfer characteristics Hls, Hlo, Hro, and Hrs and the inverse filters Linv and Rinv of the headphone characteristics are collectively referred to as out-of-head localization filters. In the case of 2ch stereo reproduction signals, the out-of-head localization filters are made up of four spatial acoustic filters and two inverse filters. The out-of-head localization device 100 carries out convolution calculation on the stereo reproduction signals by using the total six out-of-head localization filters and thereby performs out-of-head localization. The out-of-head localization filters are preferably based on measurement with respect to the user U himself/herself. For example, the out-of-head localization filters are set based on sound pickup signals picked up by the microphones worn on the ears of the user U.

As described above, the spatial acoustic filters and the inverse filters Linv and Rinv of the headphone characteristics are filters for audio signals. The filters are convolved with the reproduction signals (stereo input signals XL and XR), and the out-of-head localization device 100 thereby performs out-of-head localization. In the present embodiment, processing to generate the inverse filters Linv and Rinv is one of the technical features of the present invention. The processing to generate the inverse filters will be described hereinbelow.

(Measurement Device of Ear Canal Transfer Characteristics)

Figure 2:
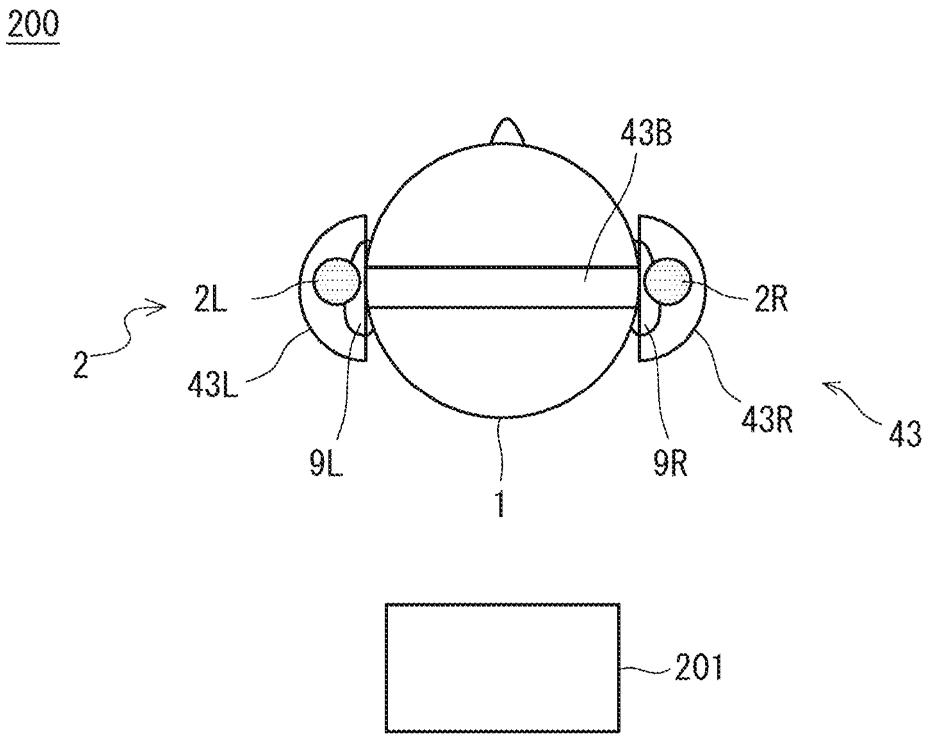
FIG. 2 is a diagram schematically showing a configuration of a measurement device.

A measurement device 200 that measures ear canal transfer characteristics to generate the inverse filters will be described using FIG. 2. FIG. 2 shows a configuration for measuring transfer characteristics with respect to the person 1 being measured. The measurement device 200 includes a microphone unit 2, the headphones 43, and a processing device 201. Note that, in this configuration, the person 1 being measured is the same person as the user U in FIG. 1.

In the present embodiment, the processing device 201 of the measurement device 200 performs calculation processing for appropriately generating filters according to measurement results. The processing device 201 is a personal computer (PC), a tablet terminal, a smartphone, or the like and includes a memory and a processor. The memory stores a processing program, various types of parameters, measurement data, and the like. The processor executes the processing program stored in the memory. The processor executing the processing program causes respective processes to be performed. The processor may be, for example, a Central Processing Unit (CPU), a Field-Programmable Gate Array (FPGA), a Digital Signal Processor (DSP), an Application Specific Integrated Circuit (ASIC), or a Graphics Processing Unit (GPU).

To the processing device 201, the microphone unit 2 and the headphones 43 are connected. Note that the microphone unit 2 may be built in the headphones 43. The microphone unit 2 include a left microphone 2L and a right microphone 2R. The left microphone 2L is placed on a left ear 9L of the person 1 being measured. The right microphone 2R is placed on a right ear 9R of the person 1 being measured. The processing device 201 may be the same processing device as the out-of-head localization device 100 or a different processing device from the out-of-head localization device 100. In addition, earphones can be used in place of the headphones 43.

The headphones 43 include a headphone band 43B, the left unit 43L, and the right unit 43R. The headphone band 43B connects the left unit 43L and the right unit 43R to each other. The left unit 43L outputs sound toward the left ear 9L of the person 1 being measured. The right unit 43R outputs sound toward the right ear 9R of the person 1 being measured. The headphones 43 are, for example, closed headphones, open headphones, semi-open headphones, or semi-closed headphones, and any type of headphones can be used. The person 1 being measured wears the headphones 43 with the microphone unit 2 worn by the person 1 being measured. In other words, the left unit 43L and the right unit 43R of the headphones 43 are placed on the left ear 9L and the right ear 9R on which the left microphone 2L and the right microphone 2R are placed, respectively. The headphone band 43B exerts a biasing force that presses the left unit 43L and the right unit 43R to the left ear 9L and the right ear 9R, respectively.

The left microphone 2L picks up sound output from the left unit 43L of the headphones 43. The right microphone 2R picks up sound output from the right unit 43R of the headphones 43. Microphone portions of the left microphone 2L and the right microphone 2R are respectively arranged at sound pickup positions in vicinities of the outer ear holes. The left microphone 2L and the right microphone 2R are configured to avoid interference with the headphones 43. In other words, the person 1 being measured can wear the headphones 43 with the left microphone 2L and the right microphone 2R placed at appropriate positions on the left ear 9L and the right ear 9R, respectively.

In this embodiment, the processing device 201 determines, as preprocessing of response measurement for generating the inverse filters, whether the variation between the right and the left is large. The processing of determining whether the variation between the right and the left is large is also referred to as determination processing. When it has been determined that the variation between the right and the left is large, a message for prompting the user to properly wear the headphones or microphones is output. For example, the processing device 201 displays a message "Wear headphones or microphones properly" on the monitor. The processing device 201 may output this message by voice. Then, the person 1 being measured wears the headphones or microphones again, and re-measurement is performed until the fit becomes good. That is, the measurement and the determination are repeated until when the variation between the right and the left becomes small.

(Determination Processing)

Figure 3:
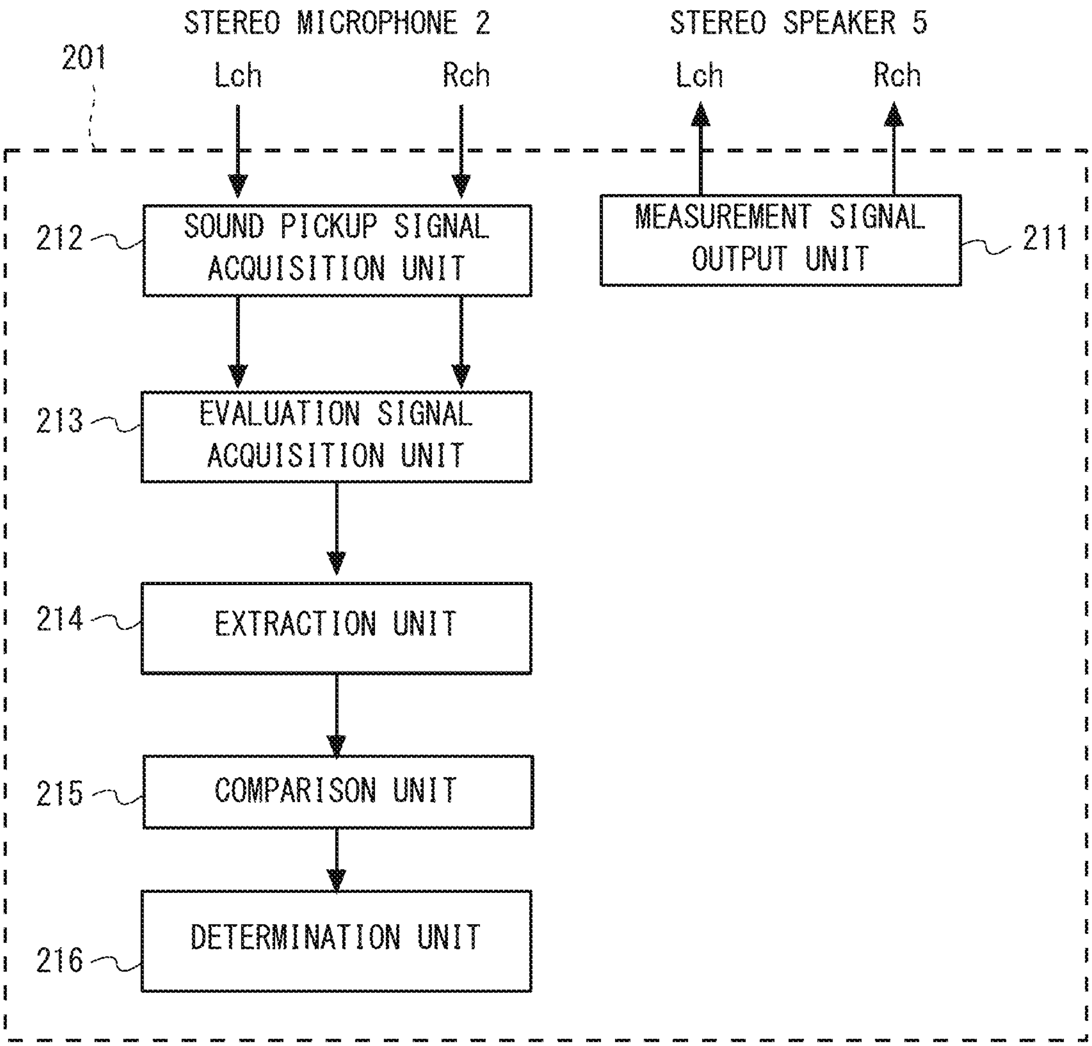
FIG. 3 is a block diagram showing a configuration of a processing device.
Figure 4:
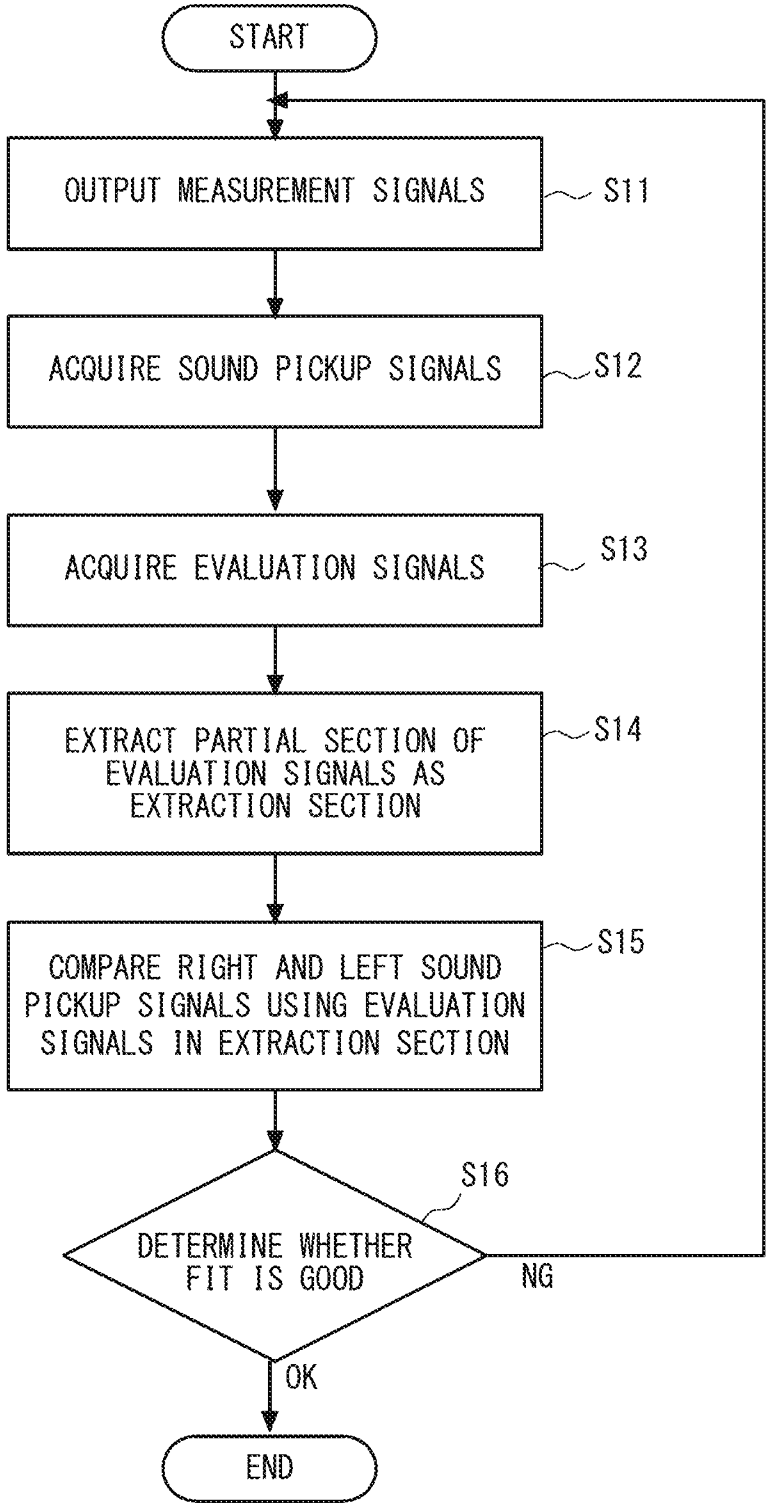
FIG. 4 is a flowchart showing a processing method.

Hereinafter, with reference to FIGS. 3 and 4, the determination processing will be described. FIG. 3 is a block diagram showing a configuration of the processing device 201. FIG. 4 is a flowchart for describing the determination processing.

A measurement signal output unit 211 outputs measurement signals (S11). The measurement signal output unit 211 includes a D/A converter, an amplifier and the like in order to output the measurement signals. The measurement signal is a frequency sweep signal whose frequency is gradually swept. Specifically, a sinusoidal signal whose frequency changes with time is used as the measurement signal. The measurement signal is a Time Stretched Pulse (TSP) signal. In this example, the measurement signal output unit 211 generates a frequency sweep signal in which the frequency is gradually increased from 100 to 500 Hz as the measurement signal. Note that the measurement signal output unit 211 may hold a plurality of measurement signals in advance. In this case, the measurement signal output unit 211 may not generate the measurement signal each time.

The measurement signal output unit 211 outputs the measurement signal to the headphones 43. The frequency sweep signal, which is the measurement signal, is output from each of the right and left output units, i.e., the left unit 43L and the right unit 43R, of the headphones 43. Each of the left microphone 2L and the right microphone 2R of the microphone unit 2 picks up the measurement signal, and outputs the sound pickup signal to the processing device 201.

A sound pickup signal acquisition unit 212 acquires the sound pickup signals picked up by the left microphone 2L and the right microphone 2R (S12). Note that the sound pickup signal acquisition unit 212 may include an A/D converter that A/D converts the sound pickup signals from the microphones 2L and 2R. The sound pickup signal acquisition unit 212 may perform synchronous addition of signals acquired as a result of a plurality of times of measurement.

The sound pickup signal picked up by the left microphone 2L is referred to as an L-ch sound pickup signal Sl and the sound pickup signal picked up by the right microphone 2R is referred to as an R-ch sound pickup signal Sr. The sound pickup signal Sl indicates transfer characteristics from the left unit 43L to the left microphone 2L and the sound pickup signal Sr indicates transfer characteristics from the right unit 43R to the right microphone 2R.

An evaluation signal acquisition unit 213 acquires evaluation signals based on the sound pickup signal Sl and the sound pickup signal Sr (S13). The evaluation signals may be, for example, a differential signal between the L-ch sound pickup signal Sl and the R-ch sound pickup signal Sr. Alternatively, the evaluation signals are envelope signals of the L-ch sound pickup signal Sl and the R-ch sound pickup signal Sr. The evaluation signals are signals in a time domain. The details of the evaluation signals will be described later. Furthermore, the evaluation signals may be the sound pickup signals Sl and Sr themselves.

Figure 5:
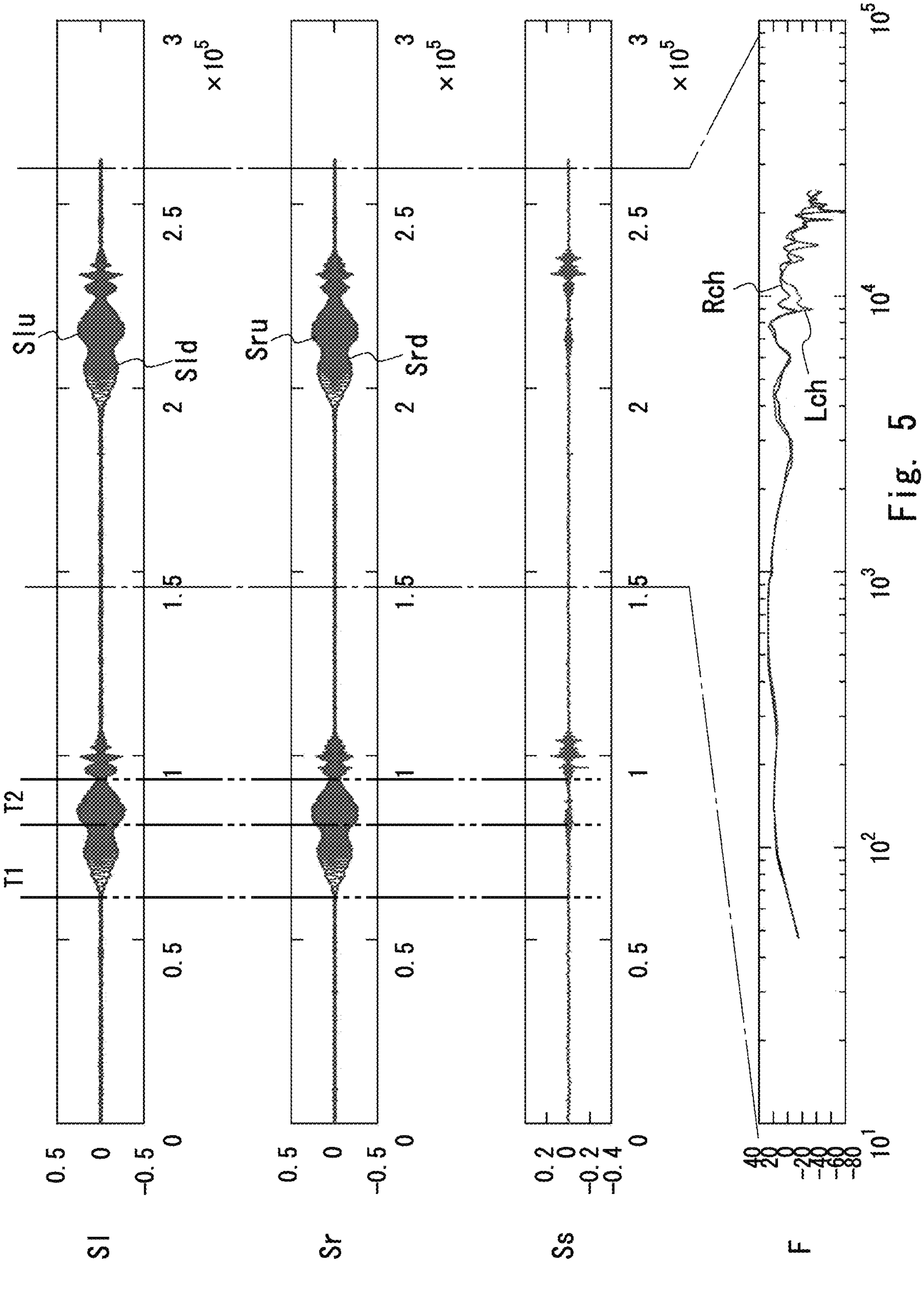
FIG. 5 is a diagram showing a signal waveform when the fit is good.
Figure 6:
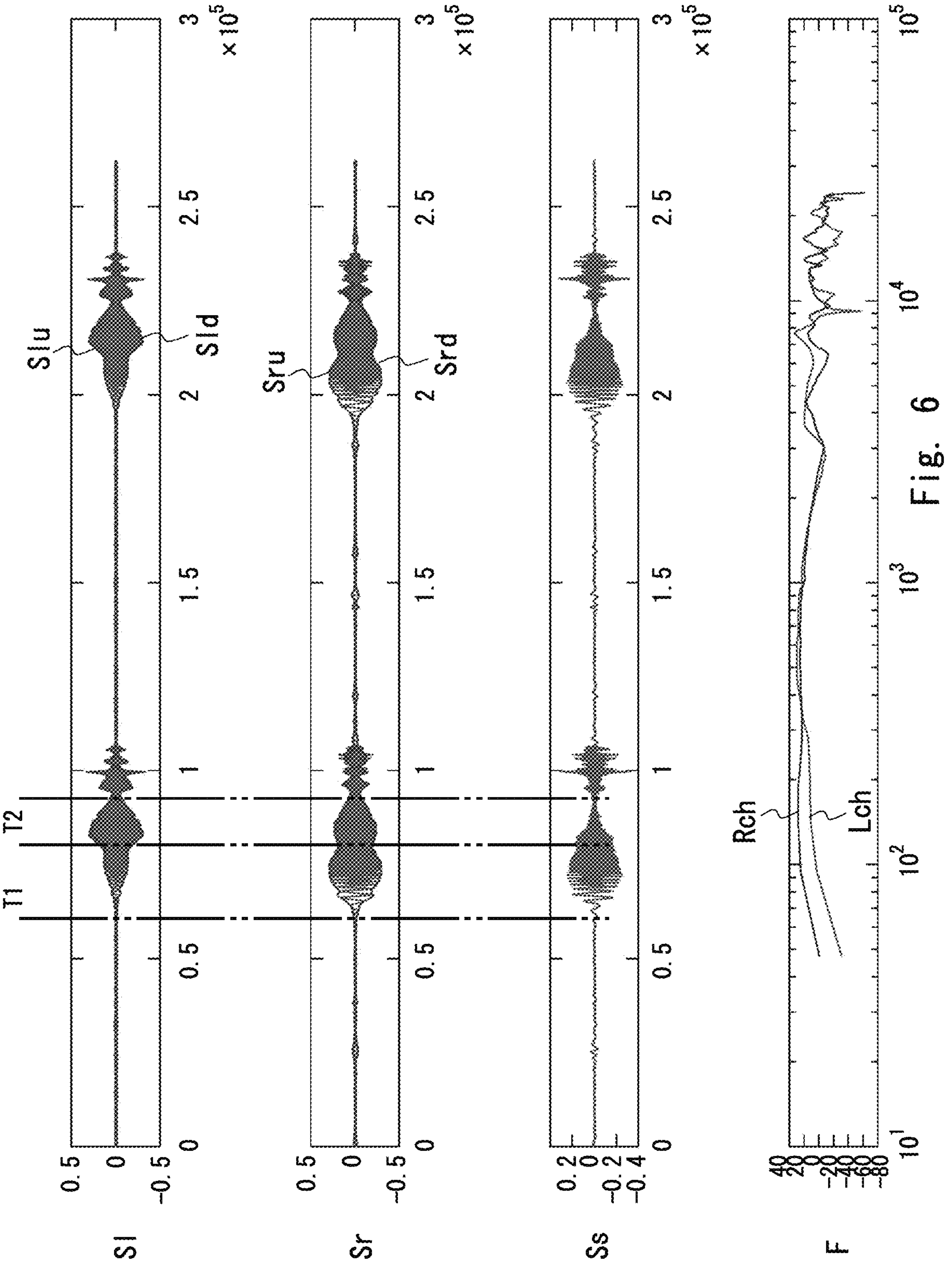
FIG. 6 is a diagram showing a signal waveform when the fit is not good.

FIGS. 5 and 6 are graphs each showing the L-ch sound pickup signal Sl and the R-ch sound pickup signal Sr. FIG. 5 show signal waveforms when the fit is good. FIG. 6 shows signal waveforms when the fit is not good. FIGS. 5 and 6 each show envelopes of the L-ch sound pickup signal Sl and the R-ch sound pickup signal Sr. Further, FIGS. 5 and 6 each show a differential signal between the L-ch sound pickup signal Sl and the R-ch sound pickup signal Sr as a differential signal Ss. Further, FIGS. 5 and 6 each show a frequency amplitude response F of the L-ch sound pickup signal Sl and that of the R-ch sound pickup signal Sr for reference. Note that the sound pickup signals Sl and Sr, and the differential signal Ss are all signals in the time domain. In FIGS. 5 and 6, the horizontal axis of the signals in the time domain is an index (integer) indicating a time.

An extraction unit 214 extracts a partial section of the evaluation signals as an extraction section (S14). For example, in FIGS. 5 and 6, the partial section that has been extracted is called an extraction section T1. The extraction unit 214 extracts the evaluation signals in the extraction section T1. If it is assumed that the evaluation signal is the differential signal Ss, the extraction unit 214 cuts out the differential signal Ss in the extraction section T1. The extraction unit 214 extracts data of the differential signal Ss in the extraction section T1. Note that the extraction unit 214 determines the extraction section T1 by a time width (time interval) in accordance with the frequency of the TSP signal. That is, the time width of the extraction section T1 is set based on the frequency of the TSP signal.

A comparison unit 215 compares the right sound pickup signal with the left sound pickup signal using the evaluation signals in the extraction section T1 (S15). That is, the comparison unit 215 detects the variation between the L-ch sound pickup signal Sl and the R-ch sound pickup signal Sr based on the evaluation signals in the extraction section T1.

For example, the comparison unit 215 calculates the evaluation value based on the evaluation signals in the extraction section T1. The evaluation value is a value for evaluating the variation between the L-ch sound pickup signal Sl and the R-ch sound pickup signal Sr. The comparison unit 215 compares the L-ch sound pickup signal Sl with the R-ch sound pickup signal Sr by comparing the evaluation value with a threshold.

A determination unit 216 determines whether the fit is good or not based on the results of the comparison made in S15 (S16). When the determination unit 216 determines that the fit is good (OK in S16), the determination processing is ended. When, for example, the evaluation value is smaller than the predetermined threshold, the determination unit 216 determines that the fit is good. That is, since the variation between the fit on the right side and the fit on the left side is small, the processing device 201 performs impulse response measurement for generating the inverse filters.

If the determination unit 216 determines that the fit is not good (NG in S16), the process returns to S11. When, for example, the evaluation value is larger than the predetermined threshold, the determination unit 216 determines that the fit is not good. That is, since the variation between the fit on the right side and the fit on the left side is large, the processing device 201 outputs a message or the like to the person 1 being measured to let him/her correct the fit. Then, the person 1 being measured wears the headphones 43 again.

After the person 1 being measured corrects the fit, the process returns to S11, where the measurement device 200 performs re-measurement. Then, the processes from S11 to S16 are repeated until when it is determined that the fit is good. Accordingly, the inverse filters may be generated from the results of measurement in the state in which the fit is good. Therefore, out-of-head localization listening with a good balance between the right and the left may be achieved.

In this embodiment, the L-ch sound pickup signal Sl is compared with the R-ch sound pickup signal Sr using the evaluation signals in the time domain. Specifically, the comparison unit 215 compares the evaluation value based on the evaluation signals in the extraction section and compares the evaluation value with the threshold. According to this procedure, conversion (fast Fourier transform (FFT) or the like) for converting the sound pickup signals into frequency responses is not necessary. That is, it is possible to determine whether the fit is good or not using only signals in the time domain. Accordingly, it is possible to determine whether the fit is good or not by simple processing and reduce the processing time. It is possible to appropriately determine whether the fit is good or not even in low-cost DSP control where it is difficult to perform conversion into a frequency domain at a high speed.

For example, in the signal waveforms shown in FIG. 5, the L-ch sound pickup signal Sl and the R-ch sound pickup signal Sr are well balanced. The state in which the L-ch sound pickup signal Sl and the R-ch sound pickup signal Sr are well balanced indicates that the frequency response of the right signal and that of the left signal coincide with each other (i.e., they are similar to each other or the difference between them is small). In particular, the difference between the frequency amplitude response F on the right side and that on the left side in a low frequency band is small. Therefore, by generating the inverse filters Linv and Rinv from the sound pickup signals Sl and Sr shown in FIG. 5, out-of-head localization with a good balance between the right and the left may be achieved.

On the other hand, in the signal waveforms shown in FIG. 6, the L-ch sound pickup signal Sl and the R-ch sound pickup signal Sr are not well balanced. The state in which the L-ch sound pickup signal Sl and the R-ch sound pickup signal Sr are not well balanced indicates that the frequency response of the right signal and that of the left signal do not coincide with each other (i.e., they are not similar to each other or the difference between them is large). In particular, the difference between the frequency amplitude response F on the right side and that on the left side in a low frequency area is large. If the inverse filters Linv and Rinv are generated from the sound pickup signals Sl and Sr shown in FIG. 6, imbalance between the right and the left occurs. In this embodiment, the L-ch sound pickup signal Sl is compared with the R-ch sound pickup signal Sr using the evaluation signals in the extraction section T1. This enables the determination unit 216 to appropriately determine whether the fit is good or not. The sound pickup signals Sl and Sr whose balance between the right and the left is not good can be eliminated. Therefore, appropriate inverse filters may be generated.

Note that the number of extraction sections extracted by the extraction unit 214 may be two or larger. For example, as shown in FIGS. 5 and 6, the extraction unit 214 may extract two extraction sections T1 and T2. As a matter of course, the number of extraction sections may be three or larger. When a plurality of extraction sections are extracted, the time widths of the extraction sections may be either different or the same. Furthermore, when a plurality of extraction sections are extracted, the extraction sections may partially overlap each other. For example, the extraction section T1 and the extraction section T2 may partially overlap each other. Further, when the extraction section T1 is a time width wider than the extraction section T2, the extraction section T1 may completely include the extraction section T2. Alternatively, a plurality of extraction sections may be completely deviated from each other.

Further, when the extraction unit 214 extracts a plurality of extraction sections, the comparison unit 215 may obtain an evaluation value for each extraction section. Then, the comparison unit 215 may compare each evaluation value with the threshold. When the evaluation value in one extraction section does not satisfy a criterion, the determination unit 216 may determine that the fit is not good. Alternatively, the determination unit 216 may make a determination by weighting a plurality of results of comparison. Note that the threshold may be changed for each extraction section. For example, the threshold is set strict (it is likely that it is determined that the fit is not good and the threshold is small) in the extraction section in a low frequency band, whereas the threshold is set loose (it is likely that it is determined that the fit is good and the threshold is large) in the extraction section in a high frequency band. According to this procedure, it is possible to properly determine whether the fit is good or not.

Next, the time width of the extraction section extracted by the extraction unit 214 will be described. The time width may be divided depending on the characteristics of the frequency sweep signal that has been output. The division of the extraction section may be performed either at linear intervals or unequal intervals. For example, in the extraction section T1 in a low frequency band, the time width is made large. In the extraction section T2 in a high frequency band, the time width is made short. By making the time width short, this width may be made close to the analysis width of FFT. In this manner, the time width of the extraction section may be determined in accordance with the frequency of the frequency sweep signal. Further, the time width of the extraction section may be determined by the frequency of the logarithmic axis (log scale).

For example, the frequency response may significantly change depending on the characteristics of the devices such as the microphone unit 2 and the headphones 43 that are used for measurement. For example, a peak or a dip may likely to occur in a specific frequency band. In this case, the frequency band where the peak or the dip is likely to occur may be a non-extraction section. The frequency band where the peak or the dip is likely to occur is removed from the extraction section since the measurement error becomes large in this frequency band. The extraction section may thus be determined based on the characteristics of the device.

The evaluation signals may be sound pickup signals themselves or may be signals calculated from the sound pickup signals. Hereinafter, the evaluation signals in the time domain will be described. The evaluation signals shown below are merely examples and the evaluation signals used in this embodiment are not limited to the following examples.

Example 1 of Evaluation Signals

The envelope signals of the sound pickup signals Sl and Sr may be used as the evaluation signals. As shown in FIGS. 5 and 6, an envelope that connects local maximum values of the L-ch sound pickup signal Sl is referred to as an upper envelope signal Slu and an envelope that connects local minimum values of the L-ch sound pickup signal Sl is referred to as a lower envelope signal Sld. Likewise, an envelope that connects local maximum values of the R-ch sound pickup signal Sr is referred to as an upper envelope signal Sru and an envelope that connects local minimum values of the R-ch sound pickup signal Sr is referred to as a lower envelope signal Srd. That is, the evaluation signal acquisition unit 213 calculates the two envelope signals Slu and Sld from the L-ch sound pickup signal Sl. The evaluation signal acquisition unit 213 calculates the two envelope signals Sru and Srd from the R-ch sound pickup signal Sr.

In this example, the evaluation signal acquisition unit 213 calculates the upper envelope signals Slu and Sru by connecting the local maximum values of the sound pickup signals Sl and Sr by spline interpolation. The evaluation signal acquisition unit 213 calculates the lower envelope signals Sld and Srd by connecting the local minimum values of the sound pickup signals Sl and Sr by spline interpolation. As a matter of course, the interpolation for obtaining the envelopes is not limited to spline interpolation.

The extraction unit 214 extracts the upper envelope signals Slu and Sru and the lower envelope signals Sld and Srd in the extraction section T1. The comparison unit 215 calculates the area between the upper envelope signal Slu and the lower envelope signal Sld in the extraction section T1 as the evaluation value. That is, the comparison unit 215 obtains, in the extraction section T1, a subtracted value obtained by subtracting the lower envelope signal Sld from the upper envelope signal Slu. The total of the subtracted values in the extraction section T1 becomes equal to the area of the extraction section T1 in Lch. The comparison unit 215 obtains a subtracted value obtained by subtracting the lower envelope signal Srd from the upper envelope signal Sru. The total of the subtracted values in the extraction section T1 becomes equal to the area of the extraction section T1 in Rch. The comparison unit 215 obtains the difference value between the area in Lch and the area in Rch as the evaluation value.

The determination unit 216 determines whether the evaluation value (the difference value of the area) is larger than a threshold. When the difference value of the area is larger than the threshold, it means that the difference between the L-ch sound pickup signal Sl and the R-ch sound pickup signal Sr is large. Therefore, since Lch and Rch are not well balanced, the determination unit 216 determines that the fit is not good. When the difference value of the area is equal to or smaller than the threshold, it means that the difference between the L-ch sound pickup signal Sl and the R-ch sound pickup signal Sr is small. Therefore, since Lch and Rch are well balanced, the determination unit 216 determines that the fit is good. In this manner, by comparing the evaluation value obtained from the evaluation signals in the extraction section with the threshold, the fit balance between the right and the left may be determined.

Example 2 of Evaluation Signals

In the example 2, the differential signal Ss is used as the evaluation signals. That is, the evaluation signal acquisition unit 213 calculates the differential signal Ss=Sl−Sr. The extraction unit 214 extracts the differential signal Ss in the extraction section T1. The comparison unit 215 calculates the total of absolute values of the differential signal Ss in the extraction section T1 as the evaluation value. Then, the comparison unit 215 compares the evaluation value with a threshold. The determination unit 216 determines whether the fit is good or not depending on the results of the comparison.

It is sufficient that the differential signal, which is the evaluation signal, be the one which is based on the difference value between the L-ch sound pickup signal Sl and the R-ch sound pickup signal Sr. For example, the differential signal Ss may be equal to Sr−Sl. Further, the evaluation signal acquisition unit 213 may use the absolute value of the difference value as the differential signal.

Example 3 of Evaluation Signals

In the example 3, the evaluation signals are the sound pickup signals Sl and Sr themselves. The evaluation signal acquisition unit 213 acquires the sound pickup signals Sl and Sr as the evaluation signals. The extraction unit 214 calculates partial sections of the sound pickup signals Sl and Sr as extraction sections. The comparison unit 215 obtains the correlating value of the sound pickup signals Sl and Sr in the extraction sections as the evaluation value. The determination unit 216 determines whether the fit is good or not by comparing the correlating value with a threshold. When the correlating value is higher than the threshold, the determination unit 216 determines that the fit is good since the sound pickup signal Sl and the sound pickup signal Sr are similar to each other. According to this procedure, the determination unit 216 is able to determine whether the right and the left are balanced.

The evaluation signals in the above examples 1 to 3 may be combined with one another. That is, the comparison unit 215 obtains evaluation values in accordance with the respective evaluation signals. The comparison unit 215 calculates the evaluation values based on the evaluation signals in the extraction section. That is, two or more evaluation values may be calculated for one extraction section. The comparison unit 215 compares the plurality of evaluation values with respective thresholds. The determination unit 216 makes determinations in accordance with the plurality of results of comparison. When, for example, one result of comparison does not satisfy a criterion, the determination unit 216 may determine that the fit is not good. Alternatively, the determination may be made by weighting a plurality of results of comparison.

(Time Difference Between Rising Times)

Further, the fit may be determined based on the time difference between rising times of evaluation signals. The comparison unit 215 obtains, for example, the rising time of the first peak of the left envelope signal Slu. Likewise, the comparison unit 215 obtains the rising time of the first peak of the right envelope signal Sru. The rising times correspond to the distance from the output unit to the microphone.

The comparison unit 215 obtains the time difference (difference) between the two rising times. When the time difference is larger than a threshold, the determination unit 216 determines that the fit is not good. When the time difference is equal to or smaller than the threshold, the determination unit 216 determines that the fit is good. When the time difference between the rising times is larger than the threshold, the level difference in the frequency amplitude response in a low frequency area increases.

As described above, the comparison unit 215 compares the time difference between the rising time on the right side and the rising time on the left side, which is the evaluation value, with the threshold. Then, the determination unit 216 determines whether the fit is good or not based on the results of comparing the evaluation value with the threshold. When Lch and Rch are not well balanced, the distance from the right output unit to the microphone becomes different from the distance from the left output unit to the microphone. That is, the arrival time of the measurement signal from the left unit 43L to the left microphone 2L is deviated from the arrival time of the measurement signal from the right unit 43R to the right microphone 2R. Accordingly, the determination unit 216 is able to determine whether the right and the left are balanced in accordance with the time difference between rising times.

Further, the extraction position (leading time) of the extraction section on the right side and that on the left side may be adjusted in accordance with the time difference between rising times. When, for example, the rising time of the upper envelope signal Slu is earlier than the rising time of the upper envelope signal Sru, the envelope signal Slu is shifted toward the anterior side (past side) by the amount corresponding to the time difference. On the other hand, when the rising time of the upper envelope signal Slu is later than the rising time of the upper envelope signal Sru, the envelope signal Sru is shifted toward the anterior side (past side) by the amount corresponding to the time difference.

When there is a difference between the rising time of the evaluation signal on the right side and that on the left side, the comparison unit 215 obtains an evaluation value by making the rising times coincide with each other. In this manner, the extraction position of the extraction period may be adjusted based on the rising time of the evaluation signal.

Further, while the extraction positions in the envelope signals as the evaluation signals have been adjusted in the aforementioned description, the extraction position in the differential signal may instead be adjusted. When, for example, there is a time difference between the rising time on the right side and that on the left side, the evaluation signal acquisition unit 213 obtains the differential signal or the correlating value of the sound pickup signal Sl and the sound pickup signal Sr by making the rising times coincide with each other. According to this procedure, the extraction position may be adjusted. That is, after the rising time on the right side and the rising time on the left side are made coincide with each other, the comparison unit 215 is able to compare the left sound pickup signal Sl with the right sound pickup signal Sr.

While the processing device 201 generates the inverse filters Linv and Rinv in the aforementioned embodiment, the processing device 201 is not limited to the one that generates the inverse filters Linv and Rinv. For example, the processing device 201 is suitable for a case where it is required to appropriately acquire right and left sound pickup signals. That is, by comparing the right and left sound pickup signals, it is possible to determine whether the headphones or the microphones are a good fit.

Further, by comparing the right sound pickup signal with the left sound pickup signal, abnormal noise during measurement may be detected. The sound pickup signals are obtained by picking up the reproduced frequency sweep signals by the microphone unit 2. When the headphones 43 or the microphone unit 2 are not properly worn, the difference between the sensitivity on the right side and that on the left side is small from a low frequency area to a middle frequency area. For example, the right and left sound pickup signals have characteristics similar to each other in a low frequency area of 4 kHz.

If sudden abnormal noise is mixed during measurement, this noise can be detected only when the length of this noise is smaller than that of the measurement signal. When, for example, the measurement signal is a frequency sweep signal whose length is about one second, the extraction period is divided, for example, by about 0.2 seconds. If a value that is significantly deviated from the expected amplitude value has been detected in each time width, it can be detected as sudden sound. The expected amplitude value may be set, for example, from the past results of measurements. Specifically, the mean value, the median value or the like of the amplitude value of each time width may be compared with the threshold.

Further, it is possible to adjust the offset amount of the inverse filters based on the evaluation signals. Specifically, it is possible to give an offset to the frequency amplitude response of the right inverse filter and that of the left inverse filter based on the evaluation signals. This point will be explained below.

An offset is given to the sound pickup signals Sl and Sr based on the representative value obtained from the differential signal Ss in the extraction section T1. When, for example, the representative value of the differential signal Ss is 10 dB, an offset of 10 dB is given to the sound pickup signal Sr. The representative value may be the maximum value, the mean value, the median value or the like. According to this procedure, it is possible to make a comparison more appropriately. The processing of giving an offset is effective when the correlation between the right and left envelope signals is high.

Second Embodiment

Figure 7:
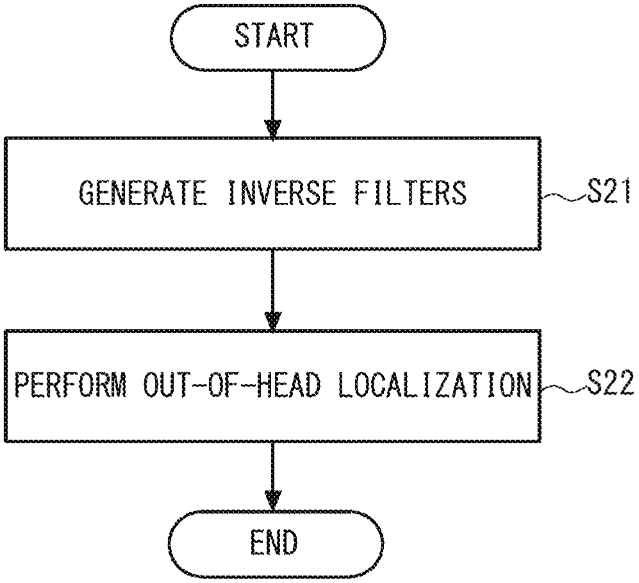
FIG. 7 is a flowchart showing processing according to this embodiment.

In this embodiment, inverse filters are generated after the determination regarding whether the fit is good or not described in the first embodiment is made. Further, out-of-head localization is performed using the inverse filters. FIG. 7 is a flowchart showing an inverse filter generation method and a reproducing method according to this embodiment.

When it is determined that the fit is good, the processing device 201 generates the inverse filters (S21). For example, by performing impulse response measurement as described above, inverse filters Linv and Rinv may be generated.

According to this procedure, the method of generating the inverse filters is performed. Appropriate inverse filters may thus be generated.

One example of processing of generating the inverse filters will be described. When it is determined that the variation between the right and the left is small, the processing device 201 generates the inverse filters by performing impulse response measurement. When it is determined that the variation between the right and the left is small, the processing device 201 outputs the measurement signal to the headphones 43. The measurement signal is an impulse signal, a Time Stretched Pulse (TSP) signal or the like. In this example, the processing device 201 performs impulse response measurement using an impulse sound as the measurement signal.

The headphones 43 generate impulse sounds or the like. Specifically, the impulse sound output from the left unit 43L is measured by the left microphone 2L. The impulse sound output from the right unit 43R is measured by the right microphone 2R. When the measurement signal is output, the left microphone 2L and the right microphone 2R acquire the respective sound pickup signals, whereby the impulse response measurement is performed.

The processing device 201 computes a frequency response of each sound pickup signal by discrete Fourier transform or discrete cosine transform. The frequency response includes a power spectrum and a phase spectrum. Note that the processing device 201 may generate an amplitude spectrum in place of the power spectrum.

The processing device 201 generates inverse filters using the power spectrum. Specifically, the processing device 201 obtains inverse characteristics that cancel out the power spectrum. The inverse characteristics are power spectra including filter factors that cancel out logarithmic power spectra.

The processing device 201 computes a signal in the time domain from inverse characteristics and the phase characteristics using inverse discrete Fourier transform or inverse discrete cosine transform. The processing device 201 generates a temporal signal by performing inverse fast Fourier transform (IFFT) on the inverse characteristics and the phase characteristics. The processing device 201 computes inverse filters by cutting out the generated temporal signal with a specified filter length. The processing device 201 generates the inverse filters Linv and Rinv by performing the same processing on the sound pickup signals from the microphones 2L and 2R. Since a well-known method may be used as the processing for obtaining the inverse filters, the detailed descriptions will be omitted.

Then, the out-of-head localization device 100 performs out-of-head localization using the inverse filters Linv and Rinv (S22). That is, the filter unit 41 and the filter unit 42 perform convolution calculation using the inverse filters Linv and Rinv. Accordingly, it is possible to reproduce a stereo signal that has been subjected to the out-of-head localization. In the reproducing method according to this embodiment, the inverse filters Linv and Rinv with a good balance between the right and the left may be used, which enables the user U to efficiently perform out-of-head localization listening. In the method of generating the inverse filters, S22 is not necessary.

A part or the whole of the above-described processing may be executed by a computer program. The above-described program can be stored using any type of non-transitory computer readable medium and provided to the computer. The non-transitory computer readable media include various types of tangible storage media. Examples of the non-transitory computer readable medium include a magnetic storage medium (such as a flexible disk, a magnetic tape, and a hard disk drive), an optical magnetic storage medium (such as a magneto-optical disk), a CD-ROM (Read Only Memory), a CD-R, a CD-R/W, and a semiconductor memory (such as a mask ROM, a PROM (Programmable ROM), an EPROM (Erasable PROM), a flash ROM, and a RAM (Random Access Memory)). The program may be provided to a computer using various types of transitory computer readable media. Examples of the transitory computer readable medium include an electric signal, an optical signal, and an electromagnetic wave. The transitory computer readable medium can supply the program to a computer via a wired communication line, such as an electric wire and an optical fiber, or a wireless communication line.

Although the invention made by the inventors are specifically described based on embodiments in the foregoing, it is needless to say that the present invention is not limited to the above-described embodiments and various changes and modifications may be made without departing from the scope of the invention.

The present disclosure is applicable to out-of-head localization techniques.

What is claimed is:

1. A processing device comprising:

a measurement signal output unit configured to output a frequency sweep signal whose frequency is swept, which is a measurement signal, to each of right and left output units of headphones or earphones;

a sound pickup signal acquisition unit configured to acquire, by a left microphone worn on a left ear of a listener, an L-ch sound pickup signal obtained by picking up the measurement signal and acquire, by a right microphone worn on the right ear of the listener, an R-ch sound pickup signal obtained by picking up the measurement signal;

an evaluation signal acquisition unit configured to acquire an evaluation signal in a time domain in accordance with the L-ch and R-ch sound pickup signals;

an extraction unit configured to extract a partial section of the evaluation signal as an extraction section;

a comparison unit configured to compare the L-ch sound pickup signal with the R-ch sound pickup signal by making rising times of the evaluation signals coincide with each other using the evaluation signal in the extraction section; and a determination unit configured to determine whether fit of the right and left microphones or the output unit is good or not based on results of the comparison made in the comparison unit.

2. The processing device according to claim 1, wherein the comparison unit calculates an evaluation value based on the evaluation signal in the extraction section, and the comparison unit compares the L-ch sound pickup signal with the R-ch sound pickup signal by comparing the evaluation value with a threshold.

3. The processing device according to claim 1, wherein the evaluation signal acquisition unit calculates an upper envelope signal that connects local maximum values of the sound pickup signal and a lower envelope signal that connects local minimum values of the sound pickup signal as the evaluation signals, the comparison unit calculates an area between the upper envelope signal and the lower envelope signal in the extraction section as an evaluation value, and the comparison unit compares the L-ch sound pickup signal with the R-ch sound pickup signal by comparing the evaluation value with a threshold.

4. The processing device according to claim 1, wherein the evaluation signal acquisition unit calculates a differential signal which is based on a difference value between the L-ch sound pickup signal and the R-ch sound pickup signal as the evaluation signal, the comparison unit calculates a total number of differential signals in the extraction section as an evaluation value, and the comparison unit compares the L-ch sound pickup signal with the R-ch sound pickup signal by comparing the evaluation value with a threshold.

5. The processing device according to claim 1, wherein the evaluation signal acquisition unit acquires the L-ch sound pickup signal and the R-ch sound pickup signal as the evaluation signals, the comparison unit calculates a correlating value of the L-ch and R-ch sound pickup signals as an evaluation value, and the comparison unit compares the L-ch sound pickup signal with the R-ch sound pickup signal by comparing the evaluation value with a threshold.

6. A processing method comprising:

outputting a frequency sweep signal whose frequency is swept, which is a measurement signal, to each of right and left output units of headphones or earphones;

acquiring, by a left microphone worn on a left ear of a listener, an L-ch sound pickup signal obtained by picking up the measurement signal and acquiring, by a right microphone worn on the right ear of the listener, an R-ch sound pickup signal obtained by picking up the measurement signal;

acquiring an evaluation signal in a time domain in accordance with the L-ch and R-ch sound pickup signals;

extracting a partial section of the evaluation signal as an extraction section;

comparing the L-ch sound pickup signal with the R-ch sound pickup signal by making rising times of the evaluation signals coincide with each other using the evaluation signal in the extraction section; and determining whether fit of the right and left microphones or the output unit is good or not based on results of the comparison made in the comparing.

7. A filter generation method for generating an inverse filter that cancels out characteristics from the output unit to the microphone when it is determined in the processing method according to claim 6 that the fit is good.

8. A reproducing method for performing out-of-head localization on a reproduction signal using the inverse filter generated in the filter generation method according to claim 7.

9. A non-transitory computer readable medium storing program for causing a computer to execute a processing method, the processing method comprising:

outputting a frequency sweep signal whose frequency is swept, which is a measurement signal, to each of right and left output units of headphones or earphones;

acquiring, by a left microphone worn on a left ear of a listener, an L-ch sound pickup signal obtained by picking up the measurement signal and acquiring, by a right microphone worn on the right ear of the listener, an R-ch sound pickup signal obtained by picking up the measurement signal;

acquiring an evaluation signal in a time domain in accordance with the L-ch and R-ch sound pickup signals;

extracting a partial section of the evaluation signal as an extraction section;

comparing the L-ch sound pickup signal with the R-ch sound pickup signal by making rising times of the evaluation signals coincide with each other using the evaluation signal in the extraction section; and determining whether fit of the right and left microphones or the output unit is good or not based on results of comparison made in the comparing.

* * * * *